(12) United States Patent
Tsuchiya et al.

(10) Patent No.: US 10,601,044 B2
(45) Date of Patent: Mar. 24, 2020

(54) NEGATIVE ELECTRODE MATERIAL FOR LITHIUM-ION SECONDARY BATTERY, METHOD FOR MANUFACTURING NEGATIVE ELECTRODE MATERIAL FOR LITHIUM-ION SECONDARY BATTERY, NEGATIVE ELECTRODE MATERIAL SLURRY FOR LITHIUM-ION SECONDARY BATTERY, NEGATIVE ELECTRODE FOR LITHIUM-ION SECONDARY BATTERY, AND LITHIUM-ION SECONDARY BATTERY

(71) Applicant: HITACHI CHEMICAL COMPANY, LTD., Tokyo (JP)

(72) Inventors: Hideyuki Tsuchiya, Tokyo (JP);
Takashi Sakamoto, Tokyo (JP);
Takeshi Masayoshi, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 16/166,735

(22) Filed: Oct. 22, 2018

(65) Prior Publication Data

US 2019/0058192 A1    Feb. 21, 2019

Related U.S. Application Data

(63) Continuation of application No. 15/127,875, filed as application No. PCT/JP2015/058980 on Mar. 24, 2015, now Pat. No. 10,122,018.

(30) Foreign Application Priority Data

Mar. 25, 2014    (JP) .................................. 2014-062431

(51) Int. Cl.
*H01M 4/587*    (2010.01)
*C01B 32/20*    (2017.01)
(Continued)

(52) U.S. Cl.
CPC ............. *H01M 4/587* (2013.01); *C01B 32/20* (2017.08); *H01M 4/0404* (2013.01);
(Continued)

(58) Field of Classification Search
CPC .. H01M 4/587; H01M 10/0525; H01M 4/133;
H01M 4/621; H01M 4/0404;
(Continued)

(56) References Cited

U.S. PATENT DOCUMENTS

2009/0130561 A1    5/2009 Matsumoto et al.
2010/0021820 A1    1/2010 Ishii
(Continued)

FOREIGN PATENT DOCUMENTS

CN    103311520 A    9/2013
CN    103328377 A    9/2013
(Continued)

OTHER PUBLICATIONS

Office Action dated Nov. 27, 2017, for Canadian Patent Application No. 2,943,545.
(Continued)

*Primary Examiner* — Gary D Harris
(74) *Attorney, Agent, or Firm* — Fitch, Even, Tabin & Flannery, L.L.P.

(57) ABSTRACT

A negative electrode material for a lithium-ion secondary battery, in which the negative electrode material includes a composite particle including a spherical graphite particle and plural graphite particles that have a compressed shape and that aggregate or are combined so as to have nonparallel orientation planes, and the negative electrode material has an R-value in a Raman measurement of from 0.03 to 0.10, and has a pore volume as obtained by mercury porosimetry of from 0.2 mL/g to 1.0 mL/g in a pore diameter range of from 0.1 μm to 8 μm.

10 Claims, 1 Drawing Sheet

(51) Int. Cl.
*H01M 4/04* (2006.01)
*H01M 4/133* (2010.01)
*H01M 4/62* (2006.01)
*H01M 10/0525* (2010.01)
*H01M 4/02* (2006.01)

(52) U.S. Cl.
CPC .......... *H01M 4/133* (2013.01); *H01M 4/621* (2013.01); *H01M 10/0525* (2013.01); *C01P 2002/82* (2013.01); *C01P 2004/03* (2013.01); *C01P 2004/32* (2013.01); *C01P 2006/11* (2013.01); *C01P 2006/12* (2013.01); *C01P 2006/14* (2013.01); *C01P 2006/16* (2013.01); *C01P 2006/40* (2013.01); *H01M 2004/021* (2013.01); *H01M 2004/027* (2013.01); *H01M 2220/30* (2013.01)

(58) Field of Classification Search
CPC ....... H01M 2220/30; H01M 2004/021; H01M 2004/027; C01B 32/20; C01P 2004/03; C01P 2004/32; C01P 2006/40; C01P 2006/16; C01P 2002/82; C01P 2006/12; C01P 2006/14; C01P 2006/11
USPC .......................................... 429/217
See application file for complete search history.

(56) References Cited

U.S. PATENT DOCUMENTS

| | | | |
|---|---|---|---|
| 2010/0297500 A1* | 11/2010 | Kawai | H01M 4/0404 429/231.8 |
| 2011/0171532 A1 | 7/2011 | Okanishi et al. | |
| 2012/0052393 A1 | 3/2012 | Kameda et al. | |
| 2012/0064403 A1 | 3/2012 | Kameda et al. | |
| 2013/0252093 A1 | 9/2013 | Yokomizo et al. | |

FOREIGN PATENT DOCUMENTS

| | | |
|---|---|---|
| EP | 2709195 A1 | 3/2014 |
| JP | H10-158005 A | 6/1998 |
| JP | 3213575 A | 10/2001 |
| JP | 2002-222650 A | 8/2002 |
| JP | 2005-259689 A | 9/2005 |
| JP | 2007-173222 A | 7/2007 |
| JP | 2009-117334 A | 5/2009 |
| JP | 2010-251314 A | 11/2010 |
| JP | 2012-109239 A | 6/2012 |
| JP | 2012-146676 A | 8/2012 |
| JP | 2013-155110 A | 8/2013 |
| JP | 6160770 B2 | 7/2017 |
| WO | 2013/171985 A1 | 11/2013 |

OTHER PUBLICATIONS

Office Action dated Dec. 20, 2016, for Canadian Patent Application No. 2,943,545.
International Search Report for PCT/JP2015/058980 dated Jun. 30, 2015; English translation submitted herewith (5 Pages).
Written Opinion of the International Searching Authority PCT/JP2015/058980 dated Jun. 30, 2015 (3 Pages).
English language translation of Written Opinion of the International Searching Authority PCT/JP2015/058980 dated Jun. 30, 2015 (3 Pages).
Claims from PCT/JP2015/058980 along with certified English language translation thereof (5 Pages).
Office Action dated Feb. 8, 2017, for Chinese Patent Application No. 201580015454.9, together with partial English language translation thereof.
Office Action dated Mar. 16, 2017, for Korean Patent Application No. 10-2016-7026332, together with English language translation thereof.

* cited by examiner

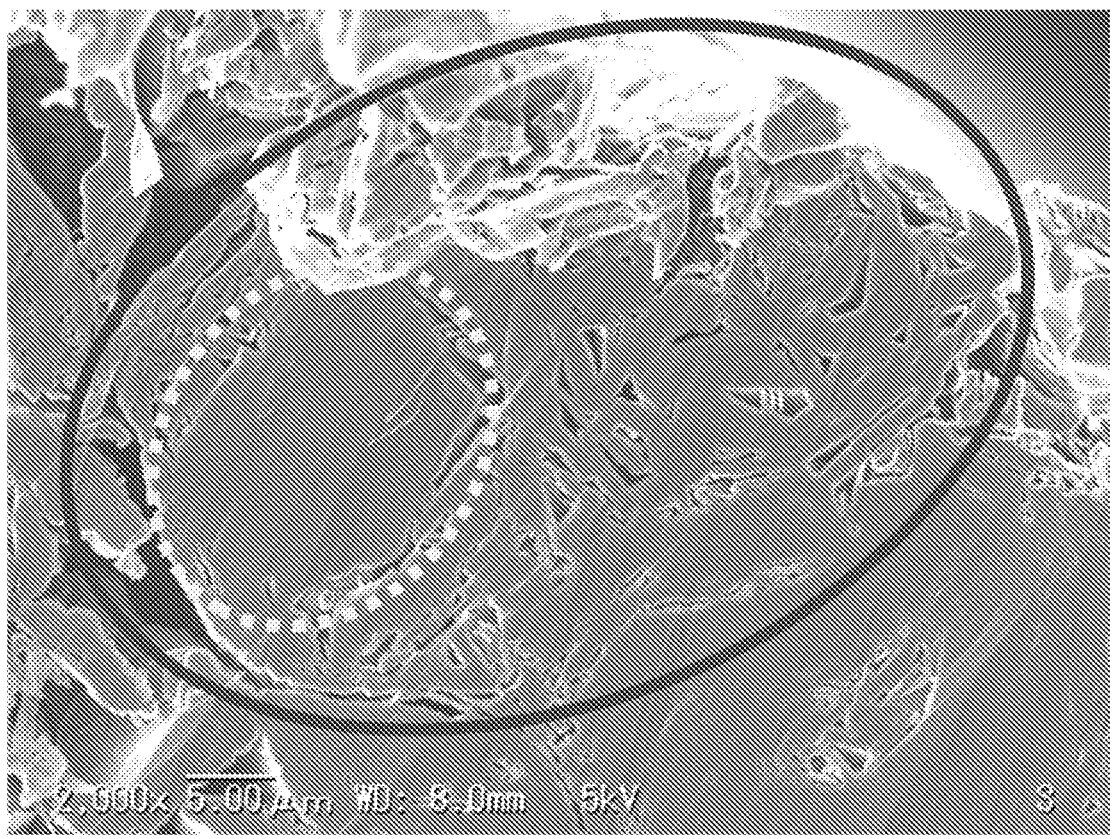

NEGATIVE ELECTRODE MATERIAL FOR LITHIUM-ION SECONDARY BATTERY, METHOD FOR MANUFACTURING NEGATIVE ELECTRODE MATERIAL FOR LITHIUM-ION SECONDARY BATTERY, NEGATIVE ELECTRODE MATERIAL SLURRY FOR LITHIUM-ION SECONDARY BATTERY, NEGATIVE ELECTRODE FOR LITHIUM-ION SECONDARY BATTERY, AND LITHIUM-ION SECONDARY BATTERY

CROSS-REFERENCE TO RELATED APPLICATIONS

This application is a continuation of U.S. Ser. No. 15/127,875, filed in the U.S on Sep. 21, 2016, which is a national phase application filed under 35 U.S.C. § 371 of International Application No. PCT/JP2015/058980, filed on Mar. 24, 2015, which claims priority from Japanese Patent Application No. 2014-062431, filed Mar. 25, 2014, the entire content of each of which are hereby incorporated herein by reference.

TECHNICAL FIELD

The present invention relates to a negative electrode material for a lithium-ion secondary battery, a method for manufacturing a negative electrode material for a lithium-ion secondary battery, a negative electrode material slurry for a lithium-ion secondary battery, a negative electrode for a lithium-ion secondary battery, and a lithium-ion secondary battery.

BACKGROUND ART

Lithium-ion secondary batteries have a higher energy density compared to other secondary batteries such as nickel-cadmium batteries, nickel-hydrogen batteries, or lead storage batteries. Thus, lithium-ion secondary batteries are used as power sources for portable electronic devices such as notebook computers and mobile phones.

Recent trends in development of lithium-ion secondary batteries include downsizing of batteries for resource saving and cost reduction, as well as expansion of applications to electric vehicles and power sources for electricity storage. Thus, there is a need to increase the density of the negative electrode for achieving a higher capacity, a higher input-output efficiency, and cost reduction. High-crystallinity carbon materials, such as artificial graphite or spherical natural graphite obtained by spheroidizing flake-shaped natural graphite, have drawn attention as a material for obtaining a high-density negative electrode.

In the case of artificial graphite, as described in Japanese Patent Application Laid-Open (JP-A) No. H10-158005, cycling performance and rapid charge-discharge properties are improved by using a graphite particle, having a secondary particle structure in which plural primary particles having a compressed shape aggregate or are combined so as to have nonparallel orientation planes, for a negative electrode material.

In a lithium-ion secondary battery, an energy density per volume can be increased by increasing the negative electrode density as mentioned above. However, the application of excessive pressure as high as 1.7 g/cm$^3$ or more to a negative electrode in order to increase the density thereof may cause many problems, such as peeling of graphite in the negative electrode from a current collector and deterioration of charge-discharge properties due to the high crystalline anisotropy of graphite.

Spherical natural graphite is characterized in that it has good peel strength and thus is hardly peeled off from a current collector even when an electrode is pressed with a strong force. However, spherical natural graphite has high reaction activity with an electrolytic solution and low permeability to an electrolytic solution. Therefore, first cycle charge-discharge efficiency and rapid charge-discharge efficiency are still scope for improvement.

SUMMARY OF INVENTION

Technical Problem

In the negative electrode material using artificial graphite having the secondary particle structure, a current collector is coated with the negative electrode material and then pressed with high pressure to increase the density. In this case, the primary particles that form the secondary particle are oriented parallel to the current collector, which may in inhibition of lithium ion migration to a positive electrode and deterioration of cycling performance. The pressing pressure after the coating can be reduced by adding spherical natural graphite for the purpose of increasing the density of the negative electrode material itself. However, there is the problem that lattice defects present on the surface of the spherical natural graphite easily react with an electrolytic solution.

Spherical natural graphite coated with a low crystallinity carbon and the like requires a strong pressing pressure for being hardened, and thus the desired density is not always achieved. Furthermore, a pressing treatment to adjust the electrode density may cause peeling of a coating layer or a defect in a coating layer, which may result in deterioration of charge-discharge properties, cycling performance, and safety.

In view of the facts above, it is an object of the present invention to provide a negative electrode material for a lithium-ion secondary battery that can provide a lithium-ion secondary battery having improved high-load characteristics even when subjected to a treatment to increase the electrode density; a method for manufacturing the negative electrode material for a lithium-ion secondary battery; a negative electrode material slurry for a lithium-ion secondary battery; a negative electrode for a lithium-ion secondary battery; and a lithium-ion secondary battery.

Solution to Problem

As a result of intensive studies by the inventors, a negative electrode material for a lithium-ion secondary battery in which the negative electrode material includes a composite particle containing a spherical graphite particle and plural graphite particles that have a compressed shape and that aggregate or are combined so as to have nonparallel orientation planes, and the negative electrode material has an R-value in a Raman measurement of from 0.03 to 0.10, and has a pore volume as obtained by mercury porosimetry of from 0.2 mL/g to 1.0 mL/g in a pore diameter range of from 0.1 µm to 8 µm, is found to be effective to approach the above problems and the present invention has been completed.

Specific means for solving the above problems include the following embodiments.

<1> A negative electrode material for a lithium-ion secondary battery, the negative electrode material including a composite particle that includes a spherical graphite particle and a plurality of graphite particles that have a compressed shape and that aggregate or are combined so as to have nonparallel orientation planes, and the negative electrode material having an R-value in a Raman measurement of from 0.03 to 0.10, and having a pore volume as obtained by mercury porosimetry of from 0.2 mL/g to 1.0 mL/g in a pore diameter range of from 0.1 μm to 8 μm.

<2> The negative electrode material for a lithium-ion secondary battery according to <1>, in which a specific surface area of the negative electrode material, as measured by a BET method, is from 1.5 m$^2$/g to 6.0 m$^2$/g.

<3> The negative electrode material for a lithium-ion secondary battery according to <1> or <2>, in which a saturated tap density of the negative electrode material is from 0.8 g/cm$^3$ to 1.2 g/cm$^3$.

<4> The negative electrode material for a lithium-ion secondary battery according to any one of <1> to <3>, in which the negative electrode material has an intensity ratio $(P_2/P_1)$ of a diffraction peak $(P_2)$ for a (101) plane of a rhombohedral crystal structure to a diffraction peak $(P_1)$ for a (101) plane of a hexagonal crystal structure in a CuKα X-ray diffraction pattern is 0.35 or less.

<5> The negative electrode material for a lithium-ion secondary battery according to any one of <1> to <4>, in which the spherical graphite particle has a circularity of 0.8 or higher.

<6> A method of manufacturing the negative electrode material for a lithium-ion secondary battery according to any one of <1> to <5>, including steps of:
(a) mixing a graphitizable aggregate or graphite with a graphitizable binder, a graphitization catalyst, and a spherical graphite particle; and
(b) calcining the mixture.

<7> The method of manufacturing the negative electrode material for a lithium-ion secondary battery according to <6>, including, between the steps (a) and (b), at least one step selected from the group consisting of (c) molding the mixture and (d) subjecting the mixture to a heat treatment.

<8> A negative electrode material slurry for a lithium-ion secondary battery, the negative electrode material slurry including:
the negative electrode material for a lithium-ion secondary battery according to any one of <1> to <5> or a negative electrode material for a lithium-ion secondary battery manufactured by the method of manufacturing a negative electrode material for a lithium-ion secondary battery according to <6> or <7>;
an organic binder; and
a solvent.

<9> A negative electrode for a lithium-ion secondary battery, the negative electrode including:
a current collector; and
a negative electrode material layer formed on the current collector and including the negative electrode material for a lithium-ion secondary battery according to any one of <1> to <5>.

<10> A lithium-ion secondary battery, including:
a positive electrode;
an electrolyte; and
the negative electrode for a lithium-ion secondary battery according to <9>.

Advantageous Effects of Invention

According to the invention, there can be provided a negative electrode material for a lithium-ion secondary battery that can provide a lithium-ion secondary battery having improved high-load characteristics even when subjected to a treatment to increase the electrode density; a method of manufacturing the negative electrode material for a lithium-ion secondary battery; a negative electrode material slurry for a lithium-ion secondary battery; a negative electrode for a lithium-ion secondary battery; and a lithium-ion secondary battery.

BRIEF DESCRIPTION OF DRAWING

FIG. 1 is a view showing an example of a scanning electron micrographic (SEM) image of a composite particle included in a negative electrode material for a lithium-ion secondary battery according to the present invention.

DESCRIPTION OF EMBODIMENTS

Hereinbelow, specific embodiments of the present invention are described in detail. However, the invention is not limited to these embodiments. In the embodiments below, the components (including element steps and the like) are not always indispensable unless otherwise expressly provided or except the case in which the components are apparently indispensable in principle. The same applies to numerical values and ranges of the components, and the invention is not limited thereby.

The term "step" as used herein includes not only a separate step but also a step that is not clearly distinguished from other steps as long as the desired effect of the step is obtained therefrom. As used herein, the notation "to" expressing a numerical range indicates a range including the numerical values before and after "to", as the minimum value and the maximum value, respectively. As regard to the amount of a component of a composition, when plural substances corresponding to the same component exist in the composition, the amount of the component in the composition refers to a total amount of the plural substances in the composition unless otherwise specified. As regard to a particle size of a component of a composition, when plural particles corresponding to the same component exist in the composition, the particle size of the component in the composition refers to a value obtained from the mixture of the plural particles exist in the composition unless otherwise specified. The term "layer" as used herein includes not only a structure configured to cover an entire surface but also a structure configured to cover a part of a surface when observed in planer view. The term "layered" refers to stacking of layers, where two or more layers may be bonded together or may be detachable from each other.

<Negative Electrode Material for Lithium-Ion Secondary Battery>

A negative electrode material for a lithium-ion secondary battery according to the invention includes a composite particle that includes a spherical graphite particle and plural graphite particles that have a compressed shape and that aggregate or are combined so as to have nonparallel orientation planes, in which the negative electrode material has an R-value in a Raman measurement of from 0.03 to 0.10, and has a pore volume as obtained by mercury porosimetry of from 0.2 mL/g to 1.0 mL/g in a pore diameter range of from 0.1 μm to 8 μm.

In a case in which the negative electrode material for a lithium-ion secondary battery is used, a lithium-ion secondary battery having improved high-load characteristics even when subjected to a treatment to increase the electrode density may be obtained. In a case in which the negative electrode material for a lithium-ion secondary battery according to the invention is used, peeling of a negative electrode active material from a current collector may be suppressed even when the negative electrode for a lithium-ion secondary battery is subjected to a treatment to increase the electrode density, and also the density of the negative electrode may be easily increased. Furthermore, even in a case in which a high-density negative electrode is used, a lithium-ion secondary battery with improved capacity, efficiency, liquid absorbing properties, safety, low-temperature characteristics, charge-discharge load characteristics, and cycle life may be obtained.

Composite Particle

The composite particle is not particularly limited as long as the composite particle includes a spherical graphite particle and plural graphite particles that have a compressed shape and that aggregate or are combined so as to have nonparallel orientation planes. For example, the composite particle may be one in which plural graphite particles having a compressed shape aggregate or are combined so as to have nonparallel orientation planes and, further, are combined with at least a part of the surface of the spherical graphite particle. More specifically, the graphite particles having a compressed shape may be combined with at least a part of the surface of the spherical graphite particle via a carbonic substance derived from a binder. The formation of the composite particle can be confirmed by, for example, the observation by a scanning electron microscope (SEM).

FIG. 1 is a view showing an example of the SEM image of the composite particle included in the negative electrode material for a lithium-ion secondary battery according to the invention. The part indicated by the dotted line in FIG. 1 corresponds to a spherical graphite particle. The composite particle (the part indicated by the solid line in FIG. 1) is formed by the spherical graphite particle and plural graphite particles present around the spherical graphite particle, in which the graphite particles have a compressed shape and that aggregate or are combined so as to have nonparallel orientation planes.

The negative electrode material for a lithium-ion secondary battery may include, in addition to the composite particle, a graphite particle having a compressed shape that does not form a composite particle, a spherical graphite particle, or an aggregate graphite particle formed by aggregating or combining plural of the graphite particles having a compressed shape.

Average Particle Size (Median Diameter)

The average particle size (median diameter) of the negative electrode material for a lithium-ion secondary battery is not particularly limited, and may be from 10 μm to 30 μm or from 15 μm to 25 μm, in terms of the influence on orientation and permeability to an electrolytic solution. The average particle size can be measured using a laser diffraction particle size distribution analyzer, and means a particle size (D50) at which a cumulative volume from the small diameter side of the obtained particle size distribution in terms of mass reaches 50%. The average particle size of the negative electrode material for a lithium-ion secondary battery means an average value of particles including the composite particles and graphite particles that do not form the composite particles.

The average particle size can be measured using a laser diffraction particle size distribution analyzer (SALD-3000J, manufactured by Shimadzu Corporation) under the following conditions.

Absorbance: 0.05 to 0.20
Sonication: 1 to 3 minutes

Examples of the method of measuring the average particle size in the case of using the negative electrode material for a lithium-ion secondary battery as a negative electrode include a method in which an electrode sample or an electrode to be observed is embedded in an epoxy resin and subjected to a mirror-polishing process, and then the electrode section is observed by a scanning electron microscope; and a method in which an electrode section prepared using an ion milling apparatus (E-3500, manufactured by Hitachi High-Technologies Corporation) is observed by a scanning electron microscope. The average particle size in this case is a median value of particle sizes of 100 particles randomly selected from the composite particles and the graphite particles that do not form the composite particles.

The electrode sample can be prepared, for example, by adding water to, as a solid component, a mixture of 98 parts by mass of the negative electrode material for a lithium-ion secondary battery, 1 part by mass of a styrene butadiene resin as a binder, and 1 part by mass of carboxymethyl cellulose as a thickener such that the mixture has a viscosity of from 1500 mPa·s to 2500 mPa·s at 25° C. to prepare a dispersion, coating a copper foil having a thickness of 10 μm with the dispersion so as to give a thickness of about 70 μm (when applied), and then dried the resultant at 120° C. for 1 hour.

Graphite Particles that have a Compressed Shape

The composite particle includes plural graphite particles that have a compressed shape and that aggregate or are combined so as to have nonparallel orientation planes.

The graphite particle having a compressed shape has a non-spherical shape having a major axis and a minor axis. Examples thereof include a graphite particle having a scaly shape, a graphite particle having a flake shape, and a graphite particle having a partially clumpy shape. More specifically, when a length along the major axis is defined as A and a length along the minor axis is defined as B, the aspect ratio represented by A/B may be from 1.2 to 5, or may be from 1.3 to 3. The aspect ratio is obtained by enlarging the graphite particles by a microscope, measuring respective A/B of randomly selected 100 graphite particles, and calculating an average value of the measured values.

The condition in which the graphite particles having a compressed shape have nonparallel orientation planes means a condition in which each plane (orientation plane) parallel to a plane having a maximum sectional area of two or more of the graphite particles having a compressed shape is not in mutually parallel relationship to the others. The condition whether or not the graphite particles having a compressed shape have mutually nonparallel orientation planes can be confirmed by the micrographic observation. In a case in which the graphite particles having a compressed shape aggregate or are combined so as to have mutually nonparallel orientation planes, advantageous effects, such as suppression of an increase in the degree of orientation of the particles on the electrode and achievement of high charge-discharge capacity, may be obtained.

The condition in which the graphite particles having a compressed shape aggregate or are combined means a condition in which two or more graphite particles having a compressed shape aggregate or are combined chemically via a carbonic substance. The carbonic substance may be a carbonic substance that is a carbonized product of a binder such as tar or pitch obtained by a calcination process. In terms of mechanical strength, the particles may be combined. The condition whether or not the graphite particles having a compressed shape aggregate or are combined can be confirmed by, for example, the observation by a scanning electron microscope.

The number of the graphite particles that have a compressed shape and that aggregate or are combined may be 3 or more, or may be 10 or more.

Regarding the size of an individual graphite particle having a compressed shape, the average particle size D50 may be 50 µm or less, or may be 25 µm or less, from the viewpoint that the particles can easily aggregate or are combined. The average particle size D50 may be 1 µm or more. The average particle size D50 can be measured by a laser diffraction particle size distribution analyzer, and means a particle size at which a cumulative volume from the small diameter side of the obtained particle size distribution in terms of mass reaches 50%.

The raw material of the graphite particle having a compressed shape is not particularly limited, and examples thereof include artificial graphite, natural graphite, coke, a resin, tar, and pitch. Among these, graphite obtained from artificial graphite, natural graphite, or coke can form a soft particle having a high crystallinity and, as a result of which the density of the electrode formed therefrom tends to be easily increased. In addition, in a case in which graphite having a high crystallinity is used, the R-value of the negative electrode material for a lithium-ion secondary battery tends to be reduced and first cycle charge-discharge efficiency tends to be improved.

Spherical Graphite Particle

The composite particle includes a spherical graphite particle. In a case in which the spherical graphite particle having a high density is increased, the density of the negative electrode material may be increased as compared to a case in which only the graphite particles having a compressed shape are included, and the pressure to be applied in the treatment to increase the electrode density may be reduced. As a result, a phenomenon in which the graphite particles having a compressed shape are oriented in the direction parallel to the current collector and prevent movement of lithium ions may be suppressed.

Examples of the spherical graphite particle and a raw material thereof include spherical artificial graphite and spherical natural graphite. In terms of achievement of a sufficient saturated tap density of the negative electrode material, the spherical graphite particle may be a graphite particle having a high density. Specifically, the spherical graphite particle may be spherical natural graphite that has been subjected to a spheroidizing treatment to increase the tap density, or may be a spherical graphite particle that has been calcined at 1500° C. or higher. In a case in which a spherical graphite particle used as a raw material is subjected to a calcination treatment at 1500° C. or higher, a spherical graphite particle having a high crystallinity may be obtained, and the R-value of the negative electrode material for a lithium-ion secondary battery may be reduced as described above.

The average particle size of the spherical graphite particle is not particularly limited, and may be from 5 µm to 40 µm, from 8 µm to 35 µm, or from 10 µm to 30 µm. The average particle size thereof can be measured by a laser diffraction particle size distribution analyzer, and means a particle size at which a cumulative volume from the small diameter side of the obtained particle size distribution in terms of mass reaches 50%.

Circularity of Spherical Graphite Particle

The circularity of the spherical graphite particle may be 0.80 or higher, or 0.85 or higher. Some spherical graphite particles are deformed by a mechanical force during the manufacture of the negative electrode material for a lithium-ion secondary battery. However, the degree of orientation in the negative electrode material may be reduced and characteristics of the electrode may be improved as the overall circularity of the spherical graphite particles included in the negative electrode material for a lithium-ion secondary battery is increased. Examples of methods for increasing the circularity of the spherical graphite particle included in the negative electrode material for a lithium-ion secondary battery include use of a spherical graphite particle having high circularity as a raw material. The circularity is obtained by measuring a portion of the spherical graphite particle included in the composite particle.

The circularity of the spherical graphite particle can be determined by photographing a section of the spherical graphite particle and calculating according to the following Equation:

$$\text{Circularity} = (\text{a perimeter of an equivalent circle})/(\text{a perimeter of the sectional image of a spherical graphite particle})$$

Herein, the "equivalent circle" is a circle having the same area as the sectional image of the spherical graphite particle. The perimeter of the section image of the spherical graphite particle is the length of the outline of the sectional image of the photographed spherical graphite particle. The circularity in the invention represents a value obtained by observing the sectional image of the spherical graphite particle enlarged 1000-fold using a scanning electron microscope, selecting randomly 10 spherical graphite particles, measuring the circularity of each of the spherical graphite particles according to the above method, and calculating a mean value.

Examples of the method for measuring the circularity of the spherical graphite particle using the negative electrode material for a lithium-ion secondary battery in a negative electrode include a method in which an electrode sample or an electrode to be observed is embedded in an epoxy resin and subjected to a mirror-polishing process, and then the electrode section is observed by a scanning electron microscope; and a method in which an electrode section prepared using an ion milling apparatus (E-3500, manufactured by Hitachi High-Technologies Corporation) is observed by a scanning electron microscope.

The sample electrode can be produced, for example, in the same manner as the sample electrode used for measuring the average particle size described above.

R-value in Raman Measurement

The negative electrode material for a lithium-ion secondary battery has an R-value in a Raman measurement of from 0.03 to 0.10. The R-value may be from 0.04 to 0.10, or may be from 0.05 to 0.10. In a case in which the R-value exceeds 0.10, gaseous swelling in a lithium-ion secondary battery due to an increased amount of a decomposed product of an electrolytic solution may occur, or first cycle efficiency may be reduced. As a result of which, it may be substantially difficult to apply the negative electrode material to a high density-adaptive electrode. In a case in which the R-value is less than 0.03, the number of lattice defects in graphite for intercalation and de-intercalation of a lithium ion is too small, and thus charge-discharge load characteristics may be deteriorated.

The R-value is defined as an intensity ratio (IB/IA) of a maximum peak intensity IB near 1360 $cm^{-1}$ to a maximum peak intensity IA near 1580 $cm^{-1}$ in a Raman spectrum obtained in a Raman measurement described below.

The Raman measurement is performed using a Raman spectrometer "a laser Raman spectrometer" (model number: NRS-1000, manufactured by JASCO Corporation), by irradiating with argon-ion laser a sample plate on which the negative electrode material for a lithium-ion secondary battery or an electrode obtained by applying the negative electrode material for a lithium-ion secondary battery on a current collector and pressing the resultant is set to be flat. Measurement conditions are as follows:

Wavelength of argon laser light: 532 nm
Wavenumber resolution: 2.56 $cm^{-1}$
Measurement range: 1180 $cm^{-1}$ to 1730 $cm^{-1}$
Peak Research: Background Removal Examples of the method of obtaining the negative electrode material for a lithium-ion secondary battery that has an R-value in the Raman measurement of from 0.03 to 0.10 include a method of calcining the spherical graphite particle as described above. Examples thereof further includes a method of adjusting the percentage of the carbon residue, which is derived from a binder component such as pitch used as a raw material, to 30% by mass or less with respect to the total mass of the negative electrode material for a lithium-ion secondary battery. While a component having a low crystallinity, such as the binder component, is necessary for forming the composite particle by aggregating or combining the above-described graphite particles having a compressed shape, such a component exhibits poor crystal growth as well as low residual carbon ratio after a graphitization treatment. This leads to low productivity, and results in the formation of hard particles after a graphitization treatment. As a result, pressure is applied to the surface of the graphite particle during a pulverizing process for the purpose of adjusting the particle size or during pressing for adjusting the density of the formed electrode, and lattice defects may be generated and the R-value may be increased. Accordingly, it is effective to limit the additive amount of the binder component such that the content of the carbon residue of the binder component is limited to 30% by mass or less with respect to the total mass of the negative electrode material for a lithium-ion secondary battery.

Pore Volume

The negative electrode material for a lithium-ion secondary battery has a pore volume as obtained by mercury porosimetry of from 0.2 mL/g to 1.0 mL/g in a pore diameter range of from 0.1 μm to 8 μm. In a case in which the pore volume is less than 0.2 mL/g, the amount of the electrolytic solution serving as a medium that allows movement of lithium ions is too small in a produced lithium-ion secondary battery, as a result of which rapid charge-discharge properties tends to be deteriorated. On the other hand, in a case in which the pore volume exceeds 1.0 mL/gm, oil absorbing ability of an additive such an organic adhesive or a thickener is increased, as a result of which productivity tends to be decreased due to abnormalities in paste viscosity and insufficient adhesion to the current collector.

The pore volume as obtained by mercury porosimetry in a range of from 0.1 μm to 8 μm may be from 0.4 mL/g to 0.8 mL/g, or may be from 0.5 mL/g to 0.7 mL/g. The pore volume of the negative electrode material for a lithium-ion secondary battery can be set in the above range, for example, by appropriately adjusting a blending ratio of the spherical graphite particle.

The pore volume can be obtained by mercury porosimetry as described below.

In the mercury porosimetry, "a porosimetry analyzer AUTOPORE 9520" manufactured by Shimadzu Corporation is used. The mercury parameters are set to a mercury contact angle of 130.0° and a mercury surface tension of 485.0 mN/m (485.0 dynes/cm). A sample (about 0.3 g) is placed into a standard cell and measured under a condition of an initial pressure of 9 kPa (corresponding to about 1.3 psia and a pore diameter of about 140 μm). The capacity of a pore volume in a range of from 0.1 to 8 μm is calculated based on the obtained pore distribution.

Specific Surface Area

The specific surface area of the negative electrode material for a lithium-ion secondary battery, as measured by a BET method, may be from 1.5 $m^2/g$ to 6.0 $m^2/g$, or may be from 2.5 $m^2/g$ to 5.0 $m^2/g$.

The specific surface area is an indicator of an area of an interface with an electrolytic solution. Specifically, in a case in which the value of the specific surface area of the negative electrode material is 6.0 $m^2/g$ or less, the area of the interface between the negative electrode material for a lithium-ion secondary battery and the electrolytic solution is not too large, as a result of which gas generation may be suppressed due to the suppression of increase in reaction field for the decomposition reaction of the electrolytic solution and first cycle charge-discharge efficiency may be improved. In a case in which the value of the specific surface area of the negative electrode material is 1.5 $m^2/g$ or more, load is suppressed since a current density applied per unit area does not rapidly increase, as a result of which charge-discharge efficiency, charge acceptability, rapid charge-discharge properties, and the like tend to be improved.

The specific surface area of the negative electrode material can be measured in accordance with a known method such as a BET method (a nitrogen gas adsorption method). Preferably, the negative electrode material for a lithium-ion secondary battery or an electrode obtained by applying the negative electrode material for a lithium-ion secondary battery to a current collector and pressing the resultant is mounted in a measuring cell and subjected to a preheating treatment at 200° C. while vacuum degassing to obtain a sample, and then nitrogen gas is allowed to adsorb onto the sample using a gas adsorption apparatus (ASAP 2010, manufactured by Shimadzu Corporation). The obtained sample is subjected to a BET analysis using a five point method to calculate a specific surface area. The specific surface area of the negative electrode material for a lithium-ion secondary battery can be set in the range described above, for example, by adjusting the average particle size (i.e., the specific surface area tends to be increased as the average particle size reduces, whereas the specific surface area tends to be reduced as the average particle size increases).

Saturated Tap Density

The saturated tap density of the negative electrode material for a lithium-ion secondary battery may be from 0.8 $g/cm^3$ to 1.2 $g/cm^3$, or may be from 0.9 $g/cm^3$ to 1.1 $g/cm^3$.

The saturated tap density is an indicator of electrode densification. In a case in which the saturated tap density of the negative electrode material is 1.2 $g/cm^3$ or less, the density of the electrode obtained by coating the current collector with the negative electrode material for a lithium-ion secondary battery is high, as a result of which a pressure to be applied for adjusting the electrode density may be reduced and the original shape of the graphite particle in the electrode may be easily maintained. In a case in which the original shape of the graphite particles is maintain, it is advantageous in that the orientation of an electrode plate is reduced and lithium ions easily move in and out, which may result in improvement of cycling performance. In a case in which the saturated tap density of the negative electrode material is too high, the pore volume is reduced, and in a produced cell, the amount of the electrolytic solution serving as a medium that allows the movement of lithium ions is reduced, which may result in deterioration of rapid charge-discharge properties. Accordingly, it is preferable to adjust the saturated tap density of the negative electrode material such that the pore volume is not too low. The saturated tap density of the negative electrode material can be set in the above range by appropriately adjusting the percentage of the spherical graphite particle (i.e., the tap density tends to be increased as the ratio of the spherical graphite particle increases, whereas the tap density tends to be reduced as the ratio of the spherical graphite particle reduces).

The saturated tap density can be measured in accordance with a known method. Preferably, 100 ml of the negative electrode material for a lithium-ion secondary battery is placed in a graduated cylinder and tapped (allowed the graduated cylinder to drop from a predetermined height) until the density reaches saturation using a tap density measurement apparatus (KRS-406 manufactured by Kuramochi Scientific Instruments Co., Ltd), and then the saturated tap density is calculated.

Peak Intensity Ratio for Rhombohedral Structure

The negative electrode material for a lithium-ion secondary battery may have an intensity ratio ($P_2/P_1$) of a diffraction peak ($P_2$) for a (101) plane of a rhombohedral crystal structure to a diffraction peak ($P_1$) for a (101) plane of a hexagonal crystal structure in a CuKα X-ray diffraction pattern of 0.35 or less, or 0.30 or less. In a case in which the peak intensity ratio ($P_2/P_1$) is 0.35 or less, the negative electrode material for a lithium-ion secondary battery tends to exhibit a higher degree of graphitization, and the charge-discharge capacity tends to be increased.

The peak intensity ratio for the rhombohedral structure can be calculated based on an intensity ratio between a diffraction line for the rhombohedral structure (P1: a diffraction angle of 43.2°) and a diffraction line for the hexagonal crystal structure (P2: a diffraction angle of 44.3°) in the CuKα X-ray diffraction pattern. Herein, the diffraction angle is represented by 2θ (θ represents Bragg angle). The diffraction line from the (101) plane of the rhombohedral structure appears at the diffraction angle of 43.2°, and the diffraction line from the (101) plane from the hexagonal crystal structure appears at the diffraction angle of 44.3°.

The peak intensity ratio for the rhombohedral structure can be set in the above range by adjusting the degree of graphitization (for example, by adjusting a heat treatment temperature).

<Method of Manufacturing Negative Electrode Material for Lithium-Ion Secondary Battery>

The method of manufacturing the negative electrode material for a lithium-ion secondary battery includes the steps of: (a) mixing a graphitizable aggregate or graphite with a graphitizable binder, a graphitization catalyst, and a spherical graphite particle and (b) calcining the mixture.

According to the above method, there can be manufactured a negative electrode material for a lithium-ion secondary battery, in which the negative electrode material includes a composite particle including a spherical graphite particle and plural graphite particles that have a compressed shape and that aggregate or are combined so as to have nonparallel orientation planes, and the negative electrode material has an R-value in a Raman measurement of from 0.03 to 0.1, and has a pore volume as obtained by mercury porosimetry of from 0.2 mL/g to 1.0 mL/g in a pore diameter range of from 0.1 μm to 8 μm.

Furthermore, according to the above method, heavy metal, magnetic foreign matter, and impurities contained in the raw material are removed at high temperature when the raw material is graphitized by calcination. Therefore, an acid treatment, washing with water, or the like is not required for the spherical graphite particle such as natural graphite. As a result of which production cost may be reduced and a highly safe negative electrode material for a lithium-ion secondary battery may be provided. Furthermore, in a case in which the spherical graphite particle that has been already graphitized is used as at least a part of the raw materials together with the graphitizable aggregate, production cost may be reduced due to reduction in amount of a graphitization catalyst required for graphitizing the raw materials, reduction in calcination time for the graphitization, and the like. As a result of which the negative electrode material for a lithium-ion secondary battery may be provided at a low price while using expensive artificial graphite. In addition, the amount of the binder component to be used for manufacturing the negative electrode material for a lithium-ion secondary battery may be reduced.

In the above method, the spherical graphite particle is also calcined together with other raw materials. As a result, the R-value in the Raman measurement of the negative electrode material for a lithium-ion secondary cell may be lowered as compared to a case in which the spherical graphite particle is mixed with a graphitized material obtained by the calcination of other raw material.

In the step (a), a graphitizable aggregate or graphite is mixed with a graphitizable binder, a graphitization catalyst, and a spherical graphite particle, thereby obtaining a mixture.

Examples of the graphitizable aggregate include coke such as fluid coke, needle coke, and mosaic coke. In addition, an aggregate that has been already graphitized such as natural graphite or artificial graphite may be used. The graphitizable aggregate is not particularly limited as long as the aggregate is in powder form. Among these, the graphitizable aggregate may be an easily graphitizable coke powder such as needle coke. The graphite is not particularly limited as long as the graphite is in powder form. The particle size of the graphitizable aggregate or the graphite is preferably less than the particle size of the graphite particle having a compressed shape.

Examples of the spherical graphite particle include spherical artificial graphite particles and spherical natural graphite particles.

Examples of the graphitizable binder include coal-based, petroleum-based, or artificial pitches and tars, thermoplastic resins, and thermosetting resins.

Examples of the graphitization catalyst include substances having a graphitization catalytic effect such as silicon, iron, nickel, titanium, or boron, and carbides thereof, oxides thereof, and nitrides thereof.

The content of the spherical graphite particle may be from 5% by mass to 80% by mass, may be from 8% by mass to 75% by mass, or may be from 8% by mass to 70% by mass, with respect to 100 parts by mass of the graphitizable aggregate or the graphite. In a case in which the content of the spherical graphite particle is in the above range, a high density and a high charge-discharge capacity tends to be obtained The content of the graphitizable binder may be from 5% by mass to 80% by mass, may be 10% by mass to 80% by mass, or may be from 15% by mass to 80% by mass, with respect to 100 parts by mass of the graphitizable aggregate or the graphite. By setting the additive amount of the graphitizable binder to an appropriate amount, excess increase in the aspect ratio and specific surface area of the graphite particle having a compressed shape to be manufactured may be suppressed. Furthermore, excess increase in the R-value in the Raman measurement may be suppressed by restricting the amount of the graphitizable binder such that the content of the carbon residue derived from the binder after the calcination is 30% by mass or less with respect to the total mass of the negative electrode material for a lithium-ion secondary battery.

The graphitization catalyst may be added in an amount of from 1 part by mass to 50 parts by mass with respect to 100 parts by mass of the total amount of the graphitizable aggregate or the graphite and the graphitizable binder. In a case in which the amount of the graphitization catalyst is 1 part by mass or more, the growth of crystal in the graphitic particle tends to be improved and charge-discharge capacity tends to be improved. On the other hand, in a case in which the amount of the graphitization catalyst is 50 parts by mass or less, the graphitizable aggregate or the graphite, the graphitizable binder, the graphitization catalyst, and the spherical graphite particle may be easily mixed homogeneously and operability tends to be improved. The method of mixing the graphitization catalyst is not particularly limited as long as the method is a mixing method in which the graphitization catalyst is located on the inside of the particles or on the surface of the particles in the mixture at least before the calcination treatment for graphitization.

The method of mixing the graphitizable aggregate or the graphite with the graphitizable binder, the graphitization catalyst, and the spherical graphite particle is not particularly limited. For example, the mixing may be performed using a kneader or the like. The mixing may be performed at a temperature equal to or higher than the softening temperature of the binder. Specifically, in a case in which the graphitizable binder is pitch or tar, the temperature for the mixing may be from 50° C. to 300° C., and in a case in which the binder is a thermosetting resin, the temperature may be from 20° C. to 100° C.

In the step (b), the mixture obtained in the step (a) is calcined. In this step, the graphitizable component in the mixture is graphitized. The calcination is preferably conducted under an atmosphere in which the mixture is hardly oxidized. Examples of the calcination method include calcination in a nitrogen atmosphere, calcination in an argon gas atmosphere, or calcination in vacuum. The calcination temperature is not particularly limited as long as the graphitizable component can be graphitized. For example, the calcination temperature may be 1500° C. or higher, may be 2000° C. or higher, may be 2500° C. or higher, or may be 2800° C. or higher. The calcination temperature may be 3200° C. or lower. In a case in which the calcination temperature is 1500° C. or higher, a crystalline change occurs. In a case in which the calcination temperature is 2000° C. or higher, a graphite crystal grows well, and the amount of the graphitization catalyst remaining in the produced graphitic particle tends to be reduced (i.e., increase in an ash amount is suppressed). In any case, charge-discharge capacity and battery cycling performance tend to be improved. On the other hand, in a case in which the calcination temperature is 3200° C. or lower, sublimation of a part of the graphite may be suppressed.

The method of manufacturing the negative electrode material for a lithium-ion secondary battery may include, between the steps (a) and (b), at least one step selected from the group consisting of (c) molding the mixture and (d) subjecting the mixture to a heat treatment. Specifically, only the step (b) may be performed after the step (a), only the step (c) may be performed after the step (a), the step (b) and the step (c) may be performed in this order after the step (a), or the step (c) and the step (b) may be performed in this order after the step (a).

Molding in the step (c) of molding the mixture can be performed, for example, by pulverizing the mixture and placing the pulverized mixture in a container such as a mold.

Subjecting the mixture to the heat treatment in the step (d) of subjecting the mixture to the heat treatment is preferable, from the viewpoint of promoting graphitization. When performing the heat treatment, it is more preferable to conduct the heat treatment after molding the mixture in the step (c). The heat treatment may be conducted at 1500° C. or higher, or may be conducted at 2500° C. or higher.

In a case in which the particle size is not adjusted by molding and pulverizing the mixture before the calcination, the graphitized product obtained after the calcination may be pulverized into an intended average particle size. Alternatively, the mixture may be molded and pulverized to adjust the particle size before the calcination, and then the obtained graphitized product may be further pulverized after the calcination. The method for pulverizing the graphitized product is not particularly limited. For example, the pulverization can be performed by a known method using a jet mill, a vibration mill, a pin mill, a hammer mill, or the like. The average particle size (a median diameter) after the pulverization may be 100 µm or less, or may be from 10 µm to 50 µm.

The graphitized product after the calcination and pulverization may be subjected to an isotropic pressing treatment. Examples of the method of the isotropic pressing treatment include a method in which the graphitized product obtained by the calcination and pulverization is placed in a container made of rubber or the like and the container is sealed, followed by subjecting the container an isotropic pressing treatment using a pressing machine. The graphitized product that has been subjected to the isotropic pressing treatment is preferably crushed by a cutter mill or the like and then graded with a sieve or the like.

The method described above is one example of the method of manufacturing the negative electrode material for a lithium-ion secondary battery. The negative electrode material for a lithium-ion secondary battery may be manufactured by any method other than the above-described method. Examples of the other method include a method in which graphite particles (i.e., aggregate graphite particles) are formed by aggregating or combining plural graphite particles having a compressed shape so as to have nonparallel orientation planes, and then a spherical graphite particle is mixed therewith to form a composite particle. The method of forming the aggregate graphite particles may be referred to, for example, descriptions of Japanese Patent No. 3285520 and Japanese Patent No. 3325021.

Negative Electrode Active Material for Lithium-Ion Secondary Battery

The negative electrode active material for a lithium-ion secondary battery according to the invention includes a carbonaceous particle or a metal particle for adsorption, which is different from the graphite particle included in the negative electrode for a lithium-ion secondary battery in at least one of the shape or the physical properties. The negative electrode active material for a lithium-ion secondary battery preferably further includes at least one structure that allows adsorption of lithium ions selected from the group consisting of natural graphite, artificial graphite, amorphous coated graphite, resin coated graphite, amorphous carbon, and a metal particle for adsorption.

Negative Electrode Material Slurry for Lithium-Ion Secondary Battery

The negative electrode material slurry for a lithium-ion secondary battery according to the invention includes the negative electrode material for a lithium-ion secondary battery or a negative electrode material for a lithium-ion secondary battery manufactured by the method of manufacturing a negative electrode material for a lithium-ion secondary battery, an organic binder, and a solvent.

The organic binder is not particularly limited. Examples of the organic binder include polymer compounds such as styrene-butadiene rubbers; (meth)acrylic copolymers derived from an ethylenically unsaturated carboxylic acid ester (such as methyl(meth)acrylate, ethyl(meth)acrylate, butyl(meth)acrylate, (meth)acrylonitrile, or hydroxyethyl (meth)acrylate) and an ethylenically unsaturated carboxylic acid (such as acrylic acid, methacrylic acid, itaconic acid, fumaric acid, or maleic acid); polyvinylidene fluoride, polyethylene oxide, polyepichlorohydrin, polyphosphazene, polyacrylonitrile, polyimide, and polyamideimide.

The solvent is not particularly limited. Examples of the solvent to be used include organic solvents such as N-methylpyrrolidone, dimethylacetamide, dimethylformamide, and γ-butyrolactone.

The negative electrode material slurry for a lithium-ion secondary battery may include a thickener for adjusting viscosity, if necessary. Examples of the thickener include carboxymethylcellulose, methylcellulose, hydroxymethylcellulose, ethylcellulose, polyvinyl alcohol, polyacrylic acids and salts thereof, oxidized starch, phosphorylated starch, and casein.

An electroconductive auxiliary agent may be added to the negative electrode material slurry for a lithium-ion secondary battery, if necessary. Examples of the electroconductive auxiliary agent include carbon black, graphite, acetylene black, an oxide having electrical conductivity, and nitride having electrical conductivity.

Negative Electrode for Lithium-Ion Secondary Battery

The negative electrode for a lithium-ion secondary battery according to the invention includes a current collector, and a negative electrode material layer that is formed on the current collector and includes the negative electrode material for a lithium-ion secondary battery.

The material and shape of the current collector are not particularly limited. For example, a material made from a metal such as aluminum, copper, nickel, titanium, or stainless steel, or an alloy thereof, which is formed into a belt form, such as a foil form, a perforated foil form, or a mesh belt form, may be used. In addition, a porous material such as a porous metal (foamed metal) or carbon paper may be used.

The method for forming the negative electrode material layer including the negative electrode material for a lithium-ion secondary battery on the current collector is not particularly limited. Examples thereof include known methods such as a metal mask printing method, an electrostatic coating method, a dip coating method, a spray coating method, a roll coating method, a doctor blading method, a gravure coating method, and a screen printing method. In a case in the negative electrode material layer is integrated with the current collector, the integration may be carried out by a known method such as rolling, pressing, or a combination thereof.

The negative electrode for a lithium-ion secondary battery obtained by forming the negative electrode material layer on the current collector may be subjected to a heat treatment depending on the kind of the organic binder used. The heat treatment results in the removal of the solvent and the curing of the binder and the strength of the negative electrode is highly intensified, whereby the adhesion between particles and adhesion between the particles and the current collector may be improved. The heat treatment may be carried out in an inert atmosphere, such as helium, argon, nitrogen, or in a vacuum atmosphere, in order to prevent oxidation of the current collector during the treatment.

The negative electrode for a lithium-ion secondary battery may be pressed (pressing treatment) before the heat treatment. By the pressing treatment, the electrode density can be controlled. The electrode density may be from 1.5 g/cm$^3$ to 1.9 g/cm$^3$, or may be from 1.6 g/cm$^3$ to 1.8 g/cm$^3$. As the electrode density is increased, the volume capacity tends to be increased, the adhesion of the negative electrode material layer to the current collector tends to be improved, and cycling performance tends to be improved.

Lithium-Ion Secondary Battery

A lithium-ion secondary battery according to the invention includes a positive electrode, an electrolyte, and the negative electrode for a lithium-ion secondary battery. For example, the lithium-ion secondary battery may have a configuration in which the negative electrode and the positive electrode are arranged so as to be faced each other across a separator, and in which an electrolytic solution containing an electrolyte is injecting therein.

The positive electrode may be obtained similarly as the negative electrode by forming a positive electrode material layer on a current collector surface. In this case, as a current collector, a material made from a metal such as aluminum, titanium, or stainless steel, or an alloy thereof, which is formed into a belt form, such as a foil form, a perforated foil form, or a mesh form, may be used.

A positive electrode material to be used in the positive electrode layer is not particularly limited. Examples thereof include a metallic compound, a metallic oxide, a metallic sulfide, or an electrical conductive polymer material, which allows doping or intercalation of lithium ions. Furthermore, lithium cobaltate ($LiCoO_2$), lithium nickelate ($LiNiO_2$), lithium manganate ($LiMnO_2$), a double oxide thereof ($LiCo_xNi_yMn_zO_2$, x+y+z=1, 0<x, 0<y; $LiNi_{2-x}Mn_zO_4$, 0<x≤2), lithium manganese spinel ($LiMn_2O_4$), lithium vanadium compounds, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O$, olivine-type $LiMPO_4$ (M: Co, Ni, Mn, or Fe), an electrical conductive polymer such as polyacetylene, polyaniline, polypyrrole, polythiophene, or polyacene, or porous carbon may be used singly or in combination of two or more kinds thereof. Among these materials, lithium nickelate ($LiNiO_2$) and a double oxide thereof ($LiCo_xNi_yMn_zO_2$, x+y+z=1, 0<x, 0<y; $LiNi_{2-x}Mn_zO_4$, 0<x≤2) have high capacity and thus suitable for the positive electrode material.

Examples of the separator include nonwoven fabric, cloth, a microporous film, and a combination thereof using as the main component a polyolefin such as polyethylene or polypropylene. In a case in which the lithium-ion secondary battery to be produced has a structure in which a positive electrode and a negative electrode do not contact directly, it is unnecessary to use a separator.

Examples of the electrolytic solution to be used include a so-called organic electrolytic solution in which a lithium salt such as $LiClO_4$, $LiPF_6$, $LiAsF_6$, $LiBF_4$, or $LiSO_3CF_3$ is dissolved in a non-aqueous solvent composed singly or in a combination of two or more of ethylene carbonate, propylene carbonate, butylene carbonate, vinylene carbonate, fluoroethylene carbonate, cyclopentanone, sulfolane, 3-methylsulfolane, 2,4-dimethylsulfolane, 3-methyl-1,3-oxazolidin-2-on, γ-butyrolactone, dimethyl carbonate, diethyl carbonate, ethyl methyl carbonate, methyl propyl carbonate, butyl methyl carbonate, ethyl propyl carbonate, butyl ethyl carbonate, dipropyl carbonate, 1,2-dimethoxyethane, tetrahydrofuran, 2-methyltetrahydrofuran, 1,3-dioxolane, methyl acetate, or ethyl acetate. Among these, an electrolytic solution containing fluoroethylene carbonate is favorable, because a stable SEI (solid electrolyte interface) tends to be formed therewith on the surface of a negative electrode material and cycling performance is significantly improved.

The structure of the lithium-ion secondary battery according to the invention is not particularly limited, and examples thereof include a paper battery, a button battery, a coin battery, a layered-built battery, a cylindrical battery, and a rectangular battery. Besides a lithium-ion secondary battery, the negative electrode material for a lithium-ion secondary battery may be applied generally to an electrochemical apparatus utilizing intercalation and de-intercalation of a lithium-ion as a charge-discharge mechanism, for example, a hybrid capacitor.

EXAMPLES

Hereinafter, the present invention is described more specifically by referring to synthetic examples, Examples, and Comparative Examples. However, it should be noted that the invention is not limited to these examples.

Example 1

(1) First, 50 parts by mass of a coke powder having an average particle size of 10 μm, 20 parts by mass of tar pitch, 20 parts by mass of silicon carbide, and 10 parts by mass of spherical natural graphite having an average particle size of 20 μm (circularity: 0.92) were mixed together and stirred at 100° C. for 1 hour, thereby obtaining a mixture. Next, the obtained mixture was pulverized to a particle size of 25 μm, and the obtained pulverized powder was placed in a mold and formed into a rectangular cuboid shape. The resultant was heat treated at 1000° C. in a nitrogen atmosphere, and then calcined at 2800° C. to graphitize the graphitizable component. The molded graphite thus obtained was pulverized, thereby obtaining a graphite powder (a negative electrode material for a lithium-ion secondary battery).

With regard to the obtained graphite powder, the average particle size, the R-value, the pore volume, the specific surface area, the saturated tap density, and the peak intensity ratio for the rhombohedral structure were measured. The results are shown in Table 1. The respective measurements were carried out according to the above-described methods.

(2) Then, 98 parts by mass of the graphite powder obtained above, 1 part by mass of a styrene-butadiene rubber (BM-400B, manufactured by Nippon Zeon Co., Ltd.), and 1 part by mass of a carboxymethyl cellulose (CMC 2200, manufactured by Daicel Corporation) were mixed and kneaded, thereby obtaining a slurry. The obtained slurry was applied onto a current collector (a copper foil having a thickness of 10 μm), and the resultant was dried at 110° C. for 1 hour in an atmospheric air and integrated using a roll press device under such conditions that the applied material (active material) had an electrode density of 1.80 g/cm$^3$, thereby producing a negative electrode for a lithium-ion secondary battery.

The orientation and peel strength of the negative electrode for a lithium-ion secondary battery were measured according to the following methods. The measurement results are shown in Table 1.

<Orientation>

The orientation was determined using an X-ray diffraction measuring device with a CuKα ray as an X-ray source by measuring the surface of a sample electrode. Specifically, the X-ray diffraction pattern of the surface of the electrode sample was measured, and the orientation was determined based on the intensity of the diffraction peak for (002) plane of carbon detected near the diffraction angle 2θ of from 26° to 27° and the intensity of the diffraction peak for (110) plane of carbon detected near the diffraction angle 2θ of from 70° to 80°, in accordance with the following Formula (1):

Intensity of diffraction peak for (002) plane/Intensity of diffraction peak for (110) plane  Formula (1)

<Peel Strength>

The measurement of the peel strength at the interface between the current collector (copper foil) and the active material was conducted using an autograph (manufactured by Shimadzu Corporation) by attaching an adhesive tape to the surface of the active material and pulling the tape vertically with respect to the electrode surface.

(3) A 2016-type coin cell was produced using the negative electrode obtained above, metal lithium as a positive electrode, a mixed solution of ethylene carbonate/ethyl methyl carbonate (volume ratio: 3/7) and vinylene carbonate (0.5% by mass) including 1.0 M LiPF$_6$ as an electrolyte, a polyethylene microporous membrane having a thickness of 25 μm as a separator, and a copper plate having a thickness of 230 μm as a spacer.

With respect to the lithium-ion secondary battery, each of the charge capacity, the discharge capacity, the efficiency, the retention rate in rapid discharging, and the retention rate of low-temperature charging was measured by the following method. The measurement results are shown in Table 1.

<Charge Capacity and Discharge Capacity>

The charge-discharge capacity (first cycle charge-discharge capacity) was measured under the following conditions: the sample weight of 15.4 mg, the electrode area of 1.54 cm$^2$, the measurement temperature of 25° C., the electrode density of 1700 kg/m$^3$, the charge condition: constant current charge of 0.434 mA, constant voltage charge of 0 V (Li/Li$^+$), and cut current of 0.043 mA, and the discharge condition: constant current charge of 0.434 mA and cut voltage of 1.5 V (Li/Li$^+$).

The discharge capacity was measured under the above charge condition and discharge condition.

<Efficiency>

The efficiency was defined as a ratio (%) of the value of the measured discharge capacity with respect to the value of the measured charge capacity.

<Retention Rate in Rapid Discharging>

The retention rate in rapid discharging was measured in a thermostat at 25° C. using the coin cell produced above according to the following steps (1) to (5).

(1) Charging was conducted by charging the cell at a constant current of 0.434 mA up to 0 V (Vvs. Li/Li$^+$), and then at a constant voltage of 0 V until the current value reached 0.043 mA. The charging was paused for 30 minutes, and then a charge capacity was measured.

(2) A first cycle test was conducted by discharging at a constant current of 0.434 mA to 1.5 V (Vvs. Li/Li$^+$) and pausing for 30 minutes, and then the discharge capacity was measured.

(3) At the second cycle, the charging and the discharging of the steps (1) and (2) were repeated, and the charge capacity and the discharge capacity were measured.

(4) At the third cycle and thereafter, the measurement was performed under the same charging condition as in the step (1) and under a discharge condition that the constant current value of the step (2) was changed to 4.34 mA (third cycle), 6.51 mA (fourth cycle), 8.68 mA (fifth cycle) 10.85 mA (sixth cycle), or 13.02 mA (2.4 C) (seventh cycle).

(5) With regard to the measurement of the retention rate in rapid discharging, the retention rate (%) was calculated by dividing respective discharge capacities measured at the third to the seventh cycles by the discharge capacity at the second cycle.

<Retention Rate in Low-temperature Charging>

The retention rate in low-temperature charging was measured using the coin cell produced above according to the following steps (6) to (8).

(6) Charging and discharging were conducted in a thermostat at 25° C. according to the above steps (1), (2), and (3), and then charge capacity was measured.

(7) After the pausing of discharging of the step (6) was finished and the temperature inside the thermostat reached 0° C., charging was conducted as in the step (1) while maintaining the temperature at 0° C., and then the charge capacity was measured.

(8) With regard to the measurement of the retention rate in low-temperature charging, the retention rate (%) was calculated by dividing the charge capacity at a time when the voltage at the constant current of 0.434 mA reached 0 V (Vvs. Li/Li$^+$) at 0° C. in the step (6) by the charge capacity at a time when the voltage at the constant current of 0.434 mA reached 0 V (Vvs. Li/Li$^+$) at 25° C. in the step (3).

Example 2

The graphite powder obtained in Example 1 was placed in a rubber container, and the rubber container was sealed. The rubber container was then subjected to an isotropic pressing treatment using a pressing machine at a pressure of 9800 N/cm$^2$ (1000 kgf/cm$^2$) The graphite powder was then crushed using a cutter mill and graded with a sieve, thereby obtaining a graphite powder of Example 2.

A negative electrode for a lithium-ion secondary battery and a lithium-ion secondary battery were produced in the same manner as in Example 1, and measurements were performed in the same manner as in Example 1. The results are shown in Table 1.

Example 3

A graphite powder of Example 3 was obtained in the same manner as in Example 2 except that the coke powder, the tar pitch, and the silicon carbide were mixed, stirred, and pulverized to obtain a pulverized powder, and then the spherical natural graphite was mixed with the obtained pulverized powder.

A negative electrode for a lithium-ion secondary battery and a lithium-ion secondary battery were produced in the same manner as in Example 1, and measurements were performed in the same manner as in Example 1. The results are shown in Table 1.

Example 4

A graphite powder of Example 4 was obtained in the same manner as in Example 2 except that the coke powder, the tar pitch, and the spherical natural graphite were mixed, stirred, and pulverized to obtain a pulverized powder, and then the silicon carbide was mixed with the pulverized powder.

A negative electrode for lithium-ion secondary battery and a lithium-ion secondary battery were produced in the same manner as in Example 1, and measurements were performed in the same manner as in Example 1. The results are shown in Table 1.

Example 5

A graphite powder of Example 5 was obtained in the same manner as in Example 2 except that the coke powder and the tar pitch were mixed, stirred, and pulverized to obtain a pulverized powder, and then the silicon carbide and the spherical natural graphite were mixed with the pulverized powder.

A negative electrode for a lithium-ion secondary battery and a lithium-ion secondary battery were produced in the same manner as in Example 1, and measurements were performed in the same manner as in Example 1. The results are shown in Table 1.

Example 6

A graphite powder of Example 6 was obtained in the same manner as in Example 2 except that the amounts of the coke powder, the tar pitch, the silicon carbide, and the spherical natural graphite were changed to 43 parts by mass, 18.5 parts by mass, 18.5 parts by mass, and 20 parts by mass, respectively.

A negative electrode for a lithium-ion secondary battery and a lithium-ion secondary battery were produced in the same manner as in Example 1, and measurements were performed in the same manner as in Example 1. The results are shown in Table 1.

Example 7

A graphite powder of Example 7 was obtained in the same manner as in Example 6 except that the coke powder, the tar pitch, and the silicon carbide were mixed, stirred, and pulverized to obtain a pulverized powder, and then the spherical natural graphite was mixed with the pulverized powder.

A negative electrode for a lithium-ion secondary battery and a lithium-ion secondary battery were produced in the same manner as in Example 1, and measurements were performed in the same manner as in Example 1. The results are shown in Table 1.

Example 8

A graphite powder of Example 8 was obtained in the same manner as in Example 6 except that the coke powder, the tar pitch, and the spherical natural graphite were mixed, stirred, and pulverized to obtain a pulverized powder, and then the silicon carbide was mixed with the pulverized powder.

A negative electrode for a lithium-ion secondary battery and a lithium-ion secondary battery were produced in the same manner as in Example 1, and measurements were performed in the same manner as in Example 1. The results are shown in Table 1.

Example 9

A graphite powder of Example 9 was obtained in the same manner as in Example 6 except that the coke powder and the tar pitch were mixed, stirred, and pulverized to obtain a pulverized powder, and then the silicon carbide and the spherical natural graphite were mixed with the pulverized powder.

A negative electrode for a lithium-ion secondary battery and a lithium-ion secondary battery were produced in the same manner as in Example 1, and measurements were performed in the same manner as in Example 1. The results are shown in Table 1.

Example 10

A graphite powder of Example 10 was obtained in the same manner as in Example 2 except that the amounts of the coke powder, the tar pitch, the silicon carbide, and the spherical natural graphite were changed to 41 parts by mass, 16 parts by mass, 16 parts by mass, and 27 parts by mass, respectively.

A negative electrode for a lithium-ion secondary battery and a lithium-ion secondary battery were produced in the same manner as in Example 1, and measurements were performed in the same manner as in Example 1. The results are shown in Table 1.

Example 11

A graphite powder of Example 11 was obtained in the same manner as in Example 10 except that the coke powder, the tar pitch, and the silicon carbide were mixed, stirred, and pulverized to obtain a pulverized powder, and then the spherical natural graphite was mixed with the pulverized powder.

A negative electrode for lithium-ion secondary battery and a lithium-ion secondary battery were produced in the same manner as in Example 1, and measurements were performed in the same manner as in Example 1. The results are shown in Table 1.

Example 12

A graphite powder of Example 12 was obtained in the same manner as in Example 10 except that the coke powder, the tar pitch, and the spherical natural graphite were mixed, stirred, and pulverized to obtain a pulverized powder, and then the silicon carbide was mixed with the pulverized powder.

A negative electrode for a lithium-ion secondary battery and a lithium-ion secondary battery were produced in the same manner as in Example 1, and measurements were performed in the same manner as in Example 1. The results are shown in Table 1.

Example 13

A graphite powder of Example 13 was obtained in the same manner as in Example 10 except that the coke powder and the tar pitch were mixed, stirred, and pulverized to obtain a pulverized powder, and then the silicon carbide and the spherical natural graphite were mixed with the pulverized powder.

A negative electrode for a lithium-ion secondary battery and a lithium-ion secondary battery were produced in the same manner as in Example 1, and measurements were performed in the same manner as in Example 1. The results are shown in Table 1.

Example 14

A graphite powder of Example 14 was obtained in the same manner as in Example 2 except that the amounts of the coke powder, the tar pitch, the silicon carbide, and the spherical natural graphite were changed to 29 parts by mass, 11 parts by mass, 5 parts by mass, and 55 parts by mass, respectively.

A negative electrode for a lithium-ion secondary battery and a lithium-ion secondary battery were produced in the same manner as in Example 1, and measurements were performed in the same manner as in Example 1. The results are shown in Table 1.

Example 15

A graphite powder of Example 15 was obtained in the same manner as in Example 14 except that the coke powder, the tar pitch, and the silicon carbide were mixed, stirred, and pulverized to obtain a pulverized powder, and then the spherical natural graphite was mixed with the pulverized powder.

A negative electrode for a lithium-ion secondary battery and a lithium-ion secondary battery were produced in the same manner as in Example 1, and measurements were performed in the same manner as in Example 1. The results are shown in Table 1.

Example 16

A graphite powder of Example 16 was obtained in the same manner as in Example 14 except that the coke powder, the tar pitch, and the spherical natural graphite were mixed, stirred, and pulverized to obtain a pulverized powder, and then the silicon carbide was mixed with the pulverized powder.

A negative electrode for a lithium-ion secondary battery and a lithium-ion secondary battery were produced in the same manner as in Example 1, and measurements were performed in the same manner as in Example 1. The results are shown in Table 1.

Example 17

A graphite powder of Example 17 was obtained in the same manner as in Example 14 except that the coke powder and the tar pitch were mixed, stirred, and pulverized to obtain a pulverized powder, and then the silicon carbide and the spherical natural graphite were mixed with the pulverized powder.

A negative electrode for a lithium-ion secondary battery and a lithium-ion secondary battery were produced in the same manner as in Example 1, and measurements were performed in the same manner as in Example 1. The results are shown in Table 1.

Example 18

A graphite powder of Example 18 was obtained in the same manner as in Example 9 except that, instead of using the coke powder used in Example 9, the same amount of a mosaic coke having a lower crystallinity than the coke powder was used.

A negative electrode for a lithium-ion secondary battery and a lithium-ion secondary battery were produced in the same manner as in Example 1, and measurements were performed in the same manner as in Example 1. The results are shown in Table 1.

Comparative Example 1

First, 100 parts by mass of a coke powder, 40 parts by mass of tar pitch, and 25 parts by mass of silicon carbide were mixed and heated at 250° C. The obtained mixture was pulverized and then pressure-molded into a pellet form. The obtained pellet was calcined at 900° C. in nitrogen and then graphitized at 3000° C. in a graphitization furnace. The obtained graphitized product was pulverized using a hammer mill and graded with a sieve, thereby obtaining a graphite powder having an average particle size of 21 μm.

Example 19

A graphite powder of Example 19 was obtained in the same manner as in Example 9 except that, instead of using the spherical natural graphite used in Example 9, the same amount of spherical artificial graphite having an average particle size of 22 μm (circularity: 0.78) was used.

A negative electrode for a lithium-ion secondary battery and a lithium-ion secondary battery were produced in the same manner as in Example 1, and measurements were performed in the same manner as in Example 1. The results are shown in Table 1.

Example 20

A graphite powder of Example 20 was obtained in the same manner as in Example 9 except that, instead of using the spherical natural graphite used in Example 9, the same amount of spherical natural graphite having an average particle size of 23 μm (circularity: 0.95) was used.

A negative electrode for a lithium-ion secondary battery and a lithium-ion secondary battery were produced in the same manner as in Example 1, and measurements were performed in the same manner as in Example 1. The results are shown in Table 1.

Example 21

A graphite powder of Example 21 was obtained in the same manner as in Example 9 except that, instead of using the spherical natural graphite used in Example 9, the same amount of spherical natural graphite having an average particle size of 10 μm (circularity: 0.90) was used.

A negative electrode for a lithium-ion secondary battery and a lithium-ion secondary battery were produced in the same manner as in Example 1, and measurements were performed in the same manner as in Example 1. The results are shown in Table 1.

Comparative Example 2

A graphite powder of Comparative Example 2 was obtained in the same manner as in Example 9 except that, instead of using the spherical natural graphite described in Example 9, the same amount of flake-shaped natural graphite having an average particle size of 25 μm was used.

A negative electrode for a lithium-ion secondary battery and a lithium-ion secondary battery were produced in the same manner as in Example 1, and measurements were performed in the same manner as in Example 1. The results are shown in Table 1.

Comparative Example 3

A graphite powder of Comparative Example 3 was obtained in the same manner as in Example 9 except that, instead of using the spherical natural graphite described in Example 9, the same amount of flake-shaped natural graphite that had been graded to a size of 20 μm using a sieve was used.

A negative electrode for a lithium-ion secondary battery and a lithium-ion secondary battery were produced in the same manner as in Example 1, and measurements were performed in the same manner as in Example 1. The results are shown in Table 1.

Comparative Example 4

Only spherical natural graphite as used in Comparative Example 1 was placed in a graphite crucible and calcined at 2800° C. in a nitrogen atmosphere, thereby obtaining a graphite powder of Comparative Example 4.

A negative electrode for a lithium-ion secondary battery and a lithium-ion secondary battery were produced in the same manner as in Example 1, and measurements were performed in the same manner as in Example 1. The results are shown in Table 1.

Comparative Example 5

A graphite powder of Comparative Example 5 was obtained in the same manner as in Example 1 except that the coke powder as in Example 1 was not used.

A negative electrode for a lithium-ion secondary battery and a lithium-ion secondary battery were produced in the same manner as in Example 1, and measurements were performed in the same manner as in Example 1. The results are shown in Table 1.

TABLE 1

| Item | Average particle size | R-value | Pore volume | Specific surface area | Saturated tap density | Peak intensity ratio for rhombohedral structure | Orientation Unit | Peel strength | Charge capacity | Discharge capacity | Efficiency | Retention rate in rapid discharging (2.4 C) | Retention rate in low-temperature charging |
|---|---|---|---|---|---|---|---|---|---|---|---|---|---|
|  | μm | — | g/cm³ | m²/g | m²/g | — | — | mN | mAh/g | mAh/g | % | % | % |
| Example 1 | 24.0 | 0.04 | 0.76 | 2.6 | 0.80 | 0.12 | 388 | 25 | 382 | 360 | 94.3 | 80 | 52 |
| Example 2 | 23.4 | 0.07 | 0.62 | 3.5 | 0.96 | 0.17 | 417 | 30 | 384 | 362 | 94.4 | 82 | 52 |

TABLE 1-continued

| Item | Average particle size (μm) | R-value | Pore volume (g/cm³) | Specific surface area (m²/g) | Saturated tap density (m²/g) | Peak intensity ratio for rhombohedral structure | Orientation Unit | Peel strength (mN) | Charge capacity (mAh/g) | Discharge capacity (mAh/g) | Efficiency (%) | Retention rate in rapid discharging (2.4 C) (%) | Retention rate in low-temperature charging (%) |
|---|---|---|---|---|---|---|---|---|---|---|---|---|---|
| Example 3 | 23.1 | 0.05 | 0.62 | 3.6 | 0.94 | 0.19 | 417 | 30 | 384 | 362 | 94.4 | 82 | 51 |
| Example 4 | 23.2 | 0.07 | 0.61 | 3.3 | 0.96 | 0.14 | 429 | 30 | 383 | 362 | 94.5 | 80 | 50 |
| Example 5 | 23.3 | 0.06 | 0.61 | 3.4 | 0.93 | 0.18 | 418 | 30 | 382 | 361 | 94.5 | 80 | 50 |
| Example 6 | 23.1 | 0.06 | 0.60 | 3.6 | 0.96 | 0.21 | 412 | 32 | 383 | 361 | 94.3 | 83 | 53 |
| Example 7 | 22.8 | 0.07 | 0.60 | 3.6 | 0.96 | 0.19 | 422 | 32 | 383 | 362 | 94.4 | 83 | 56 |
| Example 8 | 23.0 | 0.07 | 0.59 | 3.5 | 0.97 | 0.25 | 409 | 32 | 384 | 362 | 94.4 | 82 | 52 |
| Example 9 | 23.0 | 0.07 | 0.59 | 3.6 | 0.95 | 0.20 | 410 | 32 | 383 | 362 | 94.4 | 82 | 52 |
| Example 10 | 22.9 | 0.07 | 0.55 | 3.7 | 0.98 | 0.27 | 407 | 33 | 383 | 361 | 94.2 | 82 | 54 |
| Example 11 | 22.7 | 0.08 | 0.54 | 3.8 | 0.99 | 0.23 | 420 | 33 | 384 | 362 | 94.3 | 82 | 54 |
| Example 12 | 22.8 | 0.07 | 0.56 | 3.7 | 0.99 | 0.16 | 411 | 33 | 385 | 363 | 94.3 | 83 | 52 |
| Example 13 | 22.7 | 0.09 | 0.57 | 3.8 | 1.00 | 0.23 | 402 | 33 | 382 | 360 | 94.2 | 83 | 52 |
| Example 14 | 22.4 | 0.08 | 0.53 | 4.2 | 1.04 | 0.19 | 488 | 34 | 382 | 359 | 94.0 | 79 | 54 |
| Example 15 | 22.5 | 0.08 | 0.53 | 4.3 | 1.05 | 0.23 | 501 | 34 | 382 | 359 | 94.1 | 80 | 54 |
| Example 16 | 22.5 | 0.07 | 0.51 | 4.2 | 1.04 | 0.21 | 498 | 34 | 383 | 360 | 94.0 | 78 | 53 |
| Example 17 | 22.6 | 0.10 | 0.52 | 4.2 | 1.04 | 0.30 | 503 | 34 | 381 | 358 | 93.9 | 77 | 51 |
| Example 18 | 23.2 | 0.09 | 0.61 | 3.8 | 0.93 | 0.26 | 315 | 32 | 381 | 360 | 94.7 | 85 | 59 |
| Example 19 | 22.8 | 0.06 | 0.60 | 3.0 | 0.88 | 0.21 | 419 | 28 | 383 | 362 | 94.6 | 85 | 51 |
| Example 20 | 23.5 | 0.07 | 0.56 | 3.2 | 0.99 | 0.19 | 419 | 33 | 382 | 361 | 94.5 | 83 | 54 |
| Example 21 | 20.5 | 0.12 | 0.62 | 4.1 | 0.90 | 0.26 | 515 | 26 | 384 | 360 | 93.7 | 78 | 62 |
| Comparative Example 1 | 21.0 | 0.07 | 0.64 | 4.2 | 0.79 | 0.20 | 554 | 25 | 372 | 357 | 93.5 | 73 | 49 |
| Comparative Example 2 | 22.4 | 0.06 | 0.58 | 3.9 | 0.81 | 0.18 | 838 | 24 | 383 | 355 | 92.7 | 70 | 50 |
| Comparative Example 3 | 20.3 | 0.25 | 0.60 | 5.5 | 0.94 | 0.36 | 618 | 68 | 386 | 356 | 92.2 | 63 | 63 |
| Comparative Example 4 | 20.3 | 0.03 | 0.60 | 4.1 | 0.94 | 0.12 | 671 | 44 | 382 | 358 | 93.7 | 62 | 50 |
| Comparative Example 5 | 21.0 | 0.05 | 0.50 | 2.8 | 1.16 | 0.31 | 537 | 61 | 382 | 360 | 94.2 | 66 | 53 |

Each of the graphite powders of Examples 1 to 21 included a composite particle including a spherical graphite particle and plural graphite particles that have a compressed shape and aggregate or are combined so as to have nonparallel orientation planes.

In addition, as shown in Table 1, the negative electrode material for a lithium-ion secondary battery produced in each of the Examples exhibited an improved retention rate in rapid discharging (load characteristics) as compared to the negative electrode material for a lithium-ion secondary battery produced in each of the Comparative Examples.

The disclosure of Japanese Patent Application No. 2014-062431 is entirely incorporated herein by reference. All documents, patent applications, and technical standards described in the present specification are incorporated herein by reference to the same extent as if each individual document, patent application, and technical standard were specifically and individually indicated to be incorporated by reference.

The invention claimed is:

1. A negative electrode material for a lithium-ion secondary battery, the negative electrode material comprising a composite particle including a spherical graphite particle and a plurality of graphite particles that have a compressed shape and that aggregate or are combined so as to have nonparallel orientation planes, and the negative electrode material having an R-value in a Raman measurement of from 0.03 to 0.10, and having a pore volume as obtained by mercury porosimetry of from 0.2 mL/g to 1.0 mL/g in a pore diameter range of from 0.1 μm to 8 μm.

2. The negative electrode material for a lithium-ion secondary battery according to claim 1, wherein a specific surface area of the negative electrode material, as measured by a BET method, is from 1.5 m²/g to 6.0 m²/g.

3. The negative electrode material for a lithium-ion secondary battery according to claim 1, wherein a saturated tap density of the negative electrode material is from 0.8 to 1.2 g/cm³.

4. The negative electrode material for a lithium-ion secondary battery according to claim 1, wherein of the negative electrode material has an intensity ratio (P2/P1) of a diffraction peak (P2) for a (101) plane of a rhombohedral crystal structure to a diffraction peak (P1) of a (101) plane for a hexagonal crystal structure in a CuKα X-ray diffraction pattern is 0.35 or less.

5. The negative electrode material for a lithium-ion secondary battery according to claim 1, wherein the spherical graphite particle has a circularity of 0.8 or higher.

6. A method of manufacturing the negative electrode material for a lithium-ion secondary battery according to claim 1, the method comprising steps of:
   (a) mixing a graphitizable aggregate or graphite with a graphitizable binder, a graphitization catalyst, and a spherical graphite particle; and
   (b) calcining the mixture.

7. The method of manufacturing the negative electrode material for a lithium-ion secondary battery according to claim 6, comprising, between the steps (a) and (b), at least one step selected from the group consisting of (c) molding the mixture and (d) subjecting the mixture to a heat treatment.

8. A negative electrode material slurry a lithium-ion secondary battery, the negative electrode material slurry comprising:
   the negative electrode material for a lithium-ion secondary battery according to claim 1;
   an organic binder; and
   a solvent.

9. A negative electrode for a lithium-ion secondary battery, the negative electrode comprising:
   a current collector; and
   a negative electrode material layer formed on the current collector and comprising the negative electrode material for a lithium-ion secondary battery according to claim 1.

10. A lithium-ion secondary battery, comprising:
    a positive electrode;
    an electrolyte; and
    the negative electrode for a lithium-ion secondary battery according to claim 9.

* * * * *